United States Patent [19]

Balliello et al.

[11] Patent Number: 4,944,768
[45] Date of Patent: Jul. 31, 1990

[54] SOLID FORMULATION OF ANIONIC WOOL DYES WITH ANIONIC DISPERSANT AND AMPHOTERIC SURFACTANT: GLYCINE OR BETAINE

[75] Inventors: Paolo Balliello, Rheinfelden, Fed. Rep. of Germany; Otto Schilling, Basel; Beat Bruttel, Böckten, both of Switzerland

[73] Assignee: Ciba-Geigy Corporation, Ardsley, N.Y.

[21] Appl. No.: 309,921

[22] Filed: Feb. 13, 1989

Related U.S. Application Data

[63] Continuation of Ser. No. 92,800, Sep. 3, 1987, abandoned.

[30] Foreign Application Priority Data

Sep. 10, 1986 [CH] Switzerland ............ 3638/86

[51] Int. Cl.$^5$ ............ C09B 67/24; C11D 1/88; D06P 3/14

[52] U.S. Cl. ............ 8/524; 8/543; 8/597; 8/606; 8/638; 8/641; 8/643; 8/644; 8/657; 8/676; 8/680; 8/683; 8/685; 8/917; 8/924

[58] Field of Search ............ 8/524, 597, 606

[56] References Cited

U.S. PATENT DOCUMENTS

| 4,444,564 | 4/1984 | Salathe et al. | 8/588 |
| 4,453,943 | 6/1984 | Balliello | 8/524 |
| 4,465,491 | 8/1984 | Balliello et al. | 8/524 |
| 4,487,610 | 12/1984 | Mausezahl | 8/524 |
| 4,507,126 | 3/1985 | Balliello | 8/526 |
| 4,673,410 | 6/1987 | Sandefur et al. | 8/528 |

Primary Examiner—A. Lionel Clingman
Attorney, Agent, or Firm—Wenderoth, Lind & Ponack

[57] ABSTRACT

There are disclosed solid dye formulations which comprise at least one anionic wool dye and optional additional components as well as a mixture of an anionic dispersant and an amphoteric surfactant. Such formulations are distinguished in particular by improved solubility in water.

12 Claims, No Drawings

SOLID FORMULATION OF ANIONIC WOOL DYES WITH ANIONIC DISPERSANT AND AMPHOTERIC SURFACTANT: GLYCINE OR BETAINE

This application is a continuation of now abandoned application Ser. No. 092,800, filed Sept. 3, 1987.

The present invention relates to a solid formulation of anionic wool dyes, to its preparation, and to the use thereof for dyeing or printing textile materials, especially wool and polyamide.

Surprisingly, it has been found that, inter alia, the water solubility of solid formulations of anionic wool dyes can be enhanced by the addition of a mixture of amphoteric surfactants and anionic dispersants.

Accordingly, the present invention relates to a solid formulation of anionic wool dyes comprising at least one anionic wool dye, an anionic dispersant and additional optional components, which formulation contains at least one amphoteric surfactant.

In the context of this invention, the criterion of water solubility shall be considered as fulfilled if 5 g of solid formulation are able to dissolve, without leaving any residue, over 5 minutes in 50 ml of water of 25°–30° C., under standardised mechanical conditions (MKDL test).

The anionic wool dyes can belong to the most diverse classes of dyes and may contain one or more sulfonic acid groups and one or more fibre-reactive groups. They are in particular triphenylmethane dyes containing at least two sulfonic acid groups, metal-free monoazo and disazo dyes containing one or more sulfonic acid groups and in some cases one or more fibre-reactive groups, and monoazo, disazo, azomethine and formazan dyes which contain a heavy metal atom, in particular a copper, chromium, nickel or cobalt atom, especially metallised dyes which contain two molecules of azo dye or one molecule of azo dye and one molecule of azomethine dye bonded to a metal atom, and preferably those which contain monoazo and/or disazo dyes and/or azomethine dyes as ligands and a chromium or cobalt ion as central metal atom, as well as anthraquinone dyes, in particular 1-amino-4-arylaminoanthraquinone-2-sulfonic acids or 1,4-diaryl- amino- or 1-cycloalkylamino-4-arylaminoanthraquinonesulfonic acids. By fibre-reactive groups are meant groups which are able to form a covalent bond with the natural polyamide material to be dyed.

Mixtures of anionic wool dyes or a mixture of anionic, acid and metal complex dyes may also be used. It is preferred to use a mixture of anionic wool dyes as defined herein which comprises (a) at least two dyes; or
(b) at least three dyes; or,
(c) for trichromatic or polychromatic dyeing, at least three dyes selected from dyes that give yellow, orange, red and blue dyeings.

Suitable anionic wool dyes are in particular those described in European patent application EP-A-No. 0089004 which corresponds to U.S. Pat. No. 4,444,564.

In particular the following dye classes are suitable for use as anionic wool dyes:

(a) triphenylmethane dyes having at least two sulfonic acid groups, of the formula

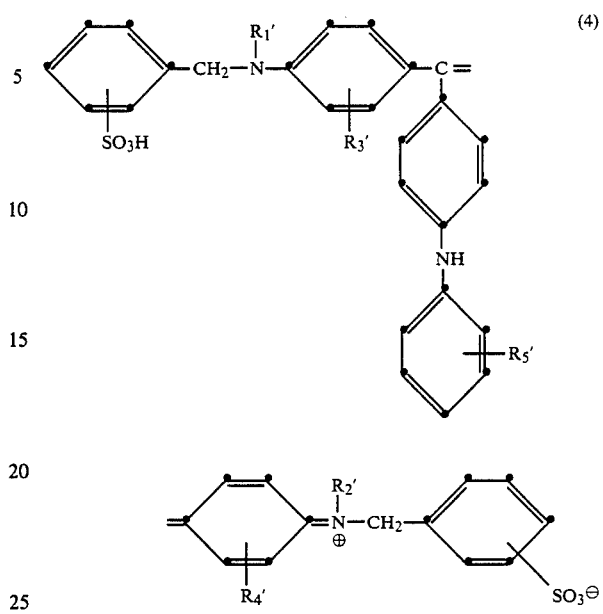

in which $R_1'$, $R_2'$, $R_3'$ and $R_4'$ independently of each other are $C_{1-4}$-alkyl and $R_5$ is $C_{1-4}$-alkyl, $C_{1-4}$-alkoxy or hydrogen;

(b) monoazo and disazo dyes of the formulae

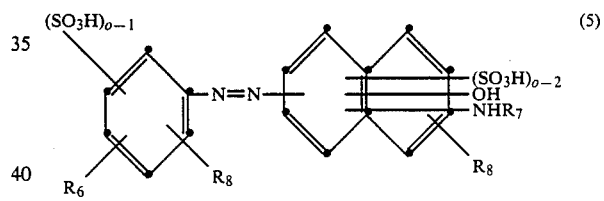

in which $R_6$ is a fibre-reactive group bonded via a -NH- group, benzoylamino, phenoxy, chlorophenoxy, dichlorophenoxy or methylphenoxy, $R_7$ is hydrogen, benzoyl, phenyl, $C_{1-4}$-alkyl, phenylsulfonyl, methylphenylsulfonyl or a fibre-reactive group which is or is not bonded via aminobenzoyl, and the substituents $R_8$ are independently of each other hydrogen or a phenylamino sulfonyl or N-phenyl-N-methylaminosulfonyl radical;

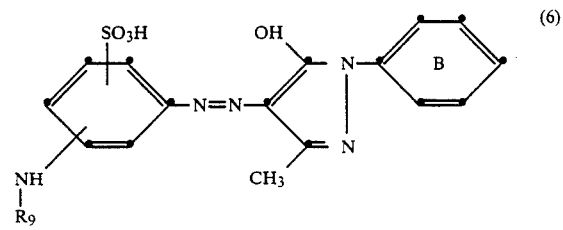

in which $R_9$ is a fibre-reactive group and the phenyl ring B can be substituted by halogen, $C_{1-4}$-alkyl and sulfo;

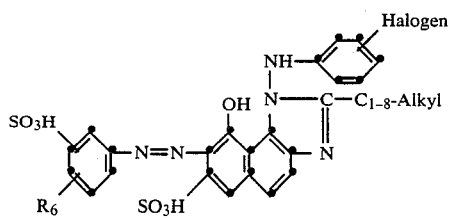

in which R₆ is as defined under formula (5);

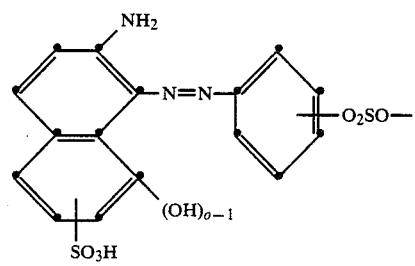

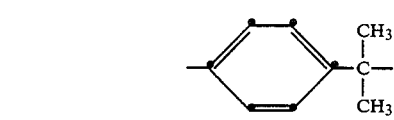

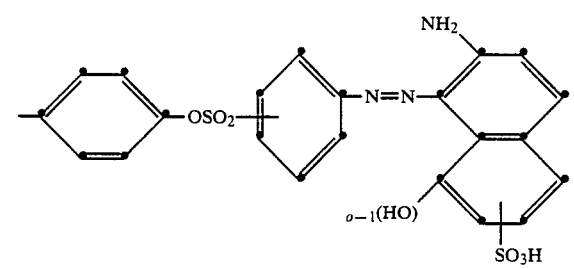

(c) 1:2 metal complex dyes such as the 1:2 chromium complex dyes of azo and azomethine dyes of the formula

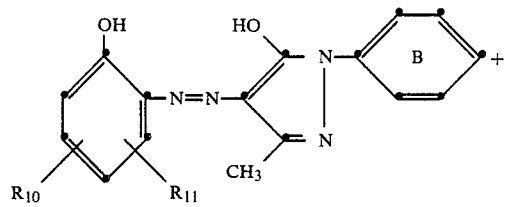

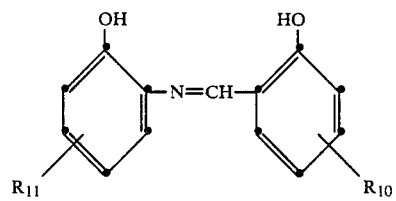

in which R₁₀ is hydrogen, sulfo or phenylazo, R₁₁ is hydrogen or nitro, and the phenyl ring B can contain the substituents specified under formula (6);

(d) 1:2 metal complex dyes such as the symmetrical 1:2 chromium complex dyes of azo dyes of the formulae

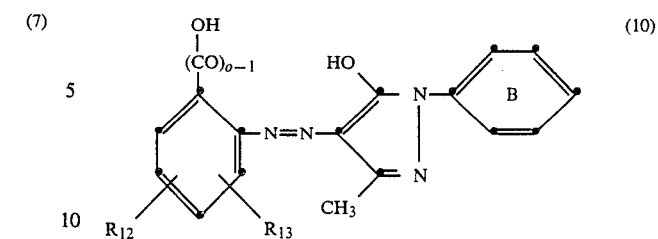

in which the phenyl ring B can contain the substituents specified under formula (6) and R₁₂ and R₁₃ independently of each other are hydrogen, nitro, sulfo, halogen, C₁₋₄-alkylsulfonyl, C₁₋₄-alkylaminosulfonyl or —SO₂NH₂; and

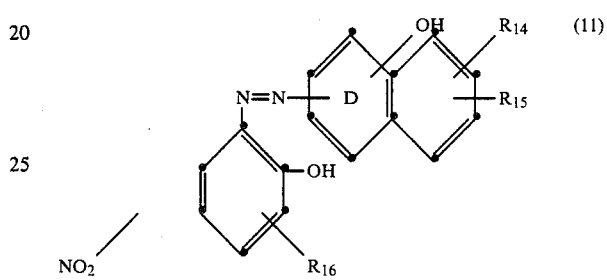

in which R₁₄ is hydrogen, C₁₋₄-alkoxycarbonylamino, benzoylamino, C₁₋₄-alkylsulfonylamino, phenylsulfonylamino, methylphenylsulfonylamino or halogen, R₁₅ is hydrogen or halogen, and R₁₆ is C₁₋₄-alkylsulfonyl, C₁₋₄-alkylaminosulfonyl, phenylazo, sulfo or —SO₂NH₂, and where the hydroxyl group in the benzo ring D is bonded in o-position relative to the azo bridge to the benzo ring D;

the symmetrical 1:2 cobalt complexes of azo dyes of the formulae

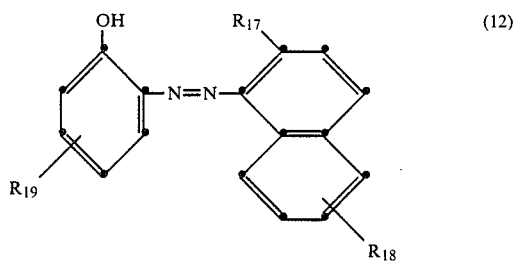

in which R₁₇ is the —OH or NH₂ group, R₁₈ is hydrogen or C₁₋₄-alkylaminosulfonyl, and R₁₉ is nitro or C₁₋₄-alkoxy- C₁₋₄-alkyleneaminosulfonyl;

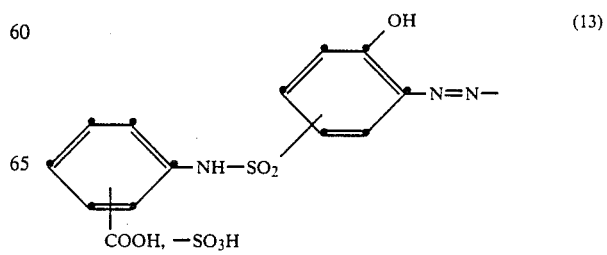

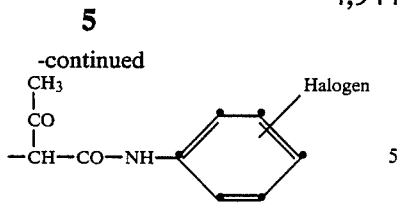

the asymmetrical 1:2 metal complex dyes such as the 1:2 chromium complex dyes of azo dyes of the formulae

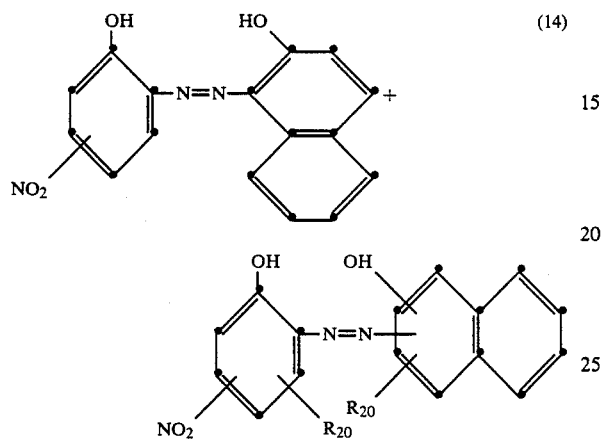

in which one of the substituents $R_{20}$ is hydrogen and the other is sulfo;

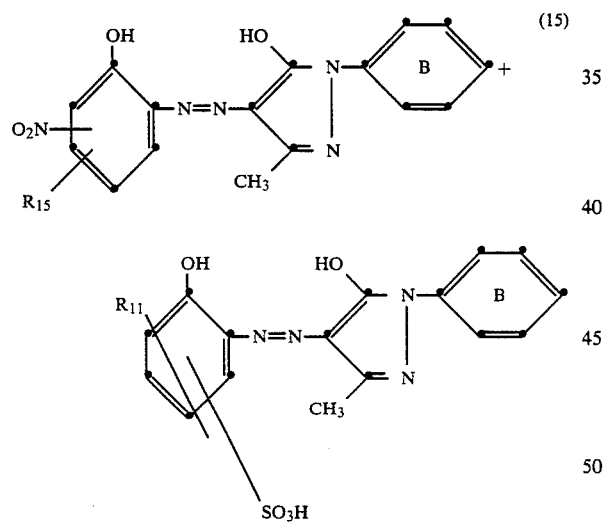

in which $R_{11}$ is as defined under formula (9) and $R_{15}$ is as defined under formula (II), and the phenyl rings B independently of each other can contain the substituents specified under formula (6);

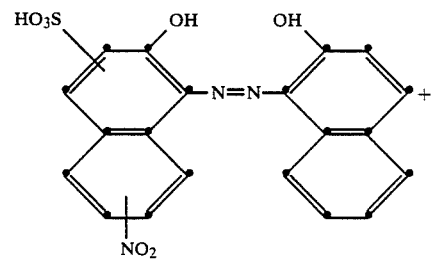

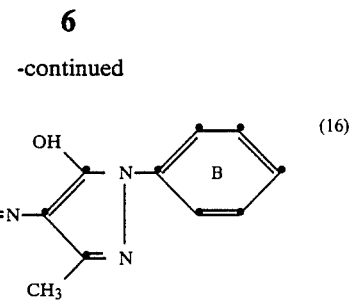

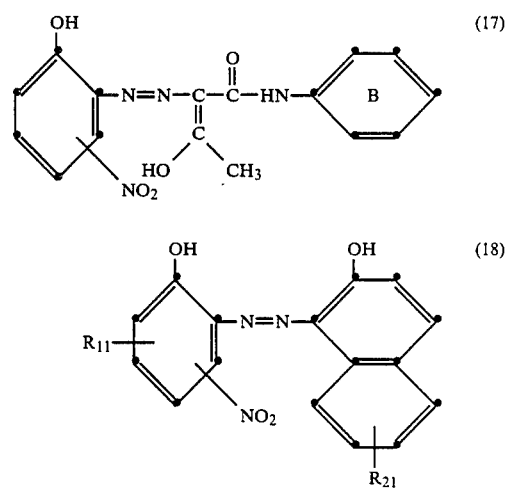

in which the phenyl ring B in the formulae (16), (17) and (19) can contain the substituents specified under formula (6), $R_{11}$ is as defined under formula (9), $R_{21}$ is hydrogen, methoxycarbonylamino or acetylamino, and $R_{16}$ is as defined under formula (11);

1:2 chromium complex dyes of azo dyes of the formulae (10)+(11); and

1:2 chromium mixed complexes of azo dyes of the formulae (10) and (11); and (e) anthraquinone dyes of the formulae

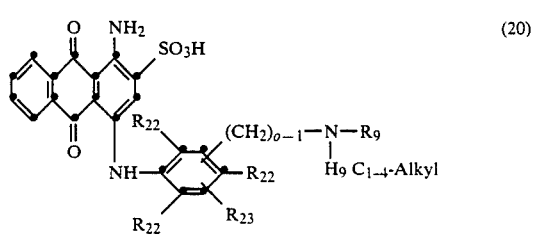

in which $R_9$ is defined under formula (6), the $R_{22}$s independently or each other are hydrogen or $C_{1-4}$-alkyl, and $R_{23}$ is hydrogen or sulfo;

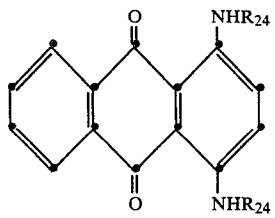 (21)

in which the substituents $R_{24}$ independently of each other are cyclohexyl or the diphenyl ether radical which can be substituted by sulfo or the radical —CH$_2$NH—R$_9$ in which R$_9$ is as defined under formula (6); and

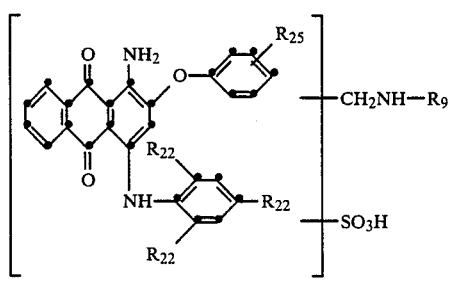 (22)

in which R$_9$ is as defined under formula (6), R$_{22}$ is as defined under formula (20), and R$_{25}$ is C$_{4-8}$-alkyl.

The amount of anionic wool dyes in the solid formulation varies from 20 to 80% by weight, based on the total formulation.

Further, wool dyes within the scope of this invention shall also be understood as comprising fluorescent whitening agents.

The anionic dispersants are the dispersants customarily employed for water-soluble dyes, e.g. condensates of aromatic sulfonic acids and formaldehyde. Particularly suitable anionic dispersants, however, are lignosulfonates, e.g. the compounds obtainable as sulfite cellulose lye. It is also possible to use mixtures of these dispersants. The granular formulations of this invention will normally contain 1 to 20% by weight, preferably 3 to 10% by weight, of anionic dispersant.

The solid formulations of this invention may contain further components customarily present in commercial formulations, e.g. diluents, for example dextrin, urea, cane sugar or inorganic salts such as sodium chloride or sodium sulfate, as well as surface-active compounds such as ethoxylated or sulfonated or sulfated organic compounds, i.e. nonionic or anionic surfactants, e.g. nonyl phenol pentadecaglycol ether, nonyl phenol diglycol ether sulfate or dodecylbenzene sulfonate, and also foam-inhibiting wetting agents.

By amphoteric surfactants are meant those compounds which, in aqueous solution, depending on the pH value, have anionic or cationic character and, close to the isoelectric point, form inner salts. According to Moore, the amphoteric surfactants are divided into ampholytes and betaines [q.v. J. Soc. Cosmetic Chemists 11, 13 (1960)].

It has been found that, to improve the water-solubility of anionic wool dyes, the amphoteric surfactants of the betaine type are suitable, preferably those of formula I

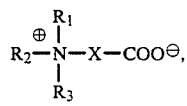 (I)

wherein the substituents $R_1$ to $R_3$ and the bridge member X have the following meanings:

$R_1$ and $R_3$ are each independently of the other a $C_1$–$C_4$alkyl radical, $R_2$ is a $C_1$–$C_{20}$alkyl radical, unsubstituted or substituted by hydroxy, acetylamino, lower alkoxy (e.g. methoxy or ethoxy) or halogen, X is a $C_1$–$C_3$alkylene radical, unsubstituted or substituted by a $C_5$–$C_{20}$alkyl radical.

A particularly effective amphoteric surfactant is betaine itself ($R_1$, $R_2$ and $R_3$=methyl, X=methylene), which is used as anhydride (absolutely dry), hydrochloride or also monohydrate, where appropriate as potassium or sodium salt.

Besides the betaines of formula I, those betaines are also suitable, for example, which carry a sulfo group (sulfobetaines) or sulfato group (sulfate betaines) instead of the carboxyl group.

Particularly good results are also obtained with other amino acids such as glycine, alanine, leucine and ethylenediaminetetraacetic acid.

The solid formulations can also contain a mixture of two or more amphoteric surfactants.

The amount of amphoteric surfactant varies from 1 to 20% by weight, preferably from 3 to 10% by weight and, most preferably, from 3 to 8% by weight, based on the solid formulation. The amount of amphoteric surfactant present in the preferred solid formulations is moreover as great as or smaller than the amount of anionic dispersant.

The solid formulations are prepared by mixing in the dry state or suspending in water one or more anionic wool dyes or fluorescent whitening agents with the addition of an anionic dispersant, further optional components and at least one amphoteric surfactant, subjecting the mixture to an optional grinding procedure, and drying the slurry so obtained, which is usually a solution or a heterogeneous system. Drying is effected in known manner, for example in a paddle drier, vacuum drier, fluidised bed drier, and by spray drying or atomising, the aqueous system being fed to the drier via a device suitable for producing drops of the desired size (e.g. a jet, pressure jet, pneumatic jet or rotating atomiser). The gas entry temperature of the drier is in the range from 130°–250° C., and the gas outlet temperature is in the range from 80°–150° C. Drying is carried out such that the temperature of the product does not exceed a specific critical limit above which the solid formulation will undergo irreversible changes.

Before the slurry is dried it can be subjected to a grinding procedure, for example in a stirred ball mill or sand mill. If grinding is effected, it is also possible to add some of the components only after the grinding procedure.

The anionic wool dye or fluorescent whitening agent can be employed e.g. as dry untreated product or as filter cake or also direct as suspension or solution obtained from the final step of the synthesis.

The solid formulations of this invention are distinguished, inter alia, by the following advantageous properties.

very good dissolving capacity and solubility in water and thus advantageous application properties;
homogeneous particle size distribution;
free-flowing;
non-dusting;
non-foaming in use.

The solid formulations of this invention may be used for the preparation of dyebaths, padding liquors or printing pastes which are particularly suitable for dyeing or printing textile material, preferably wool or polyamide material.

The following Examples serve to illustrate the invention. Parts and percentages are by weight.

EXAMPLE 1

A formulation comprising:
53.0% of the dye of formula (A)

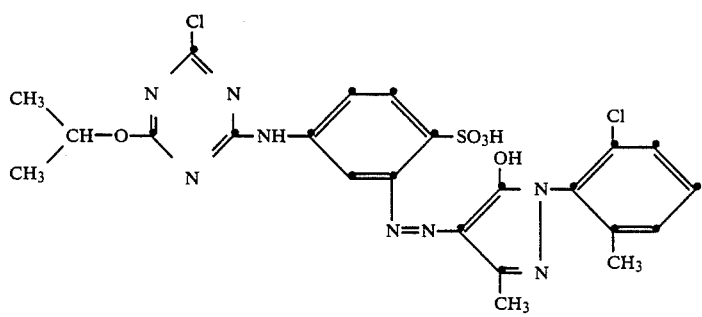

(A)

8.3% of the dye of formula (B)

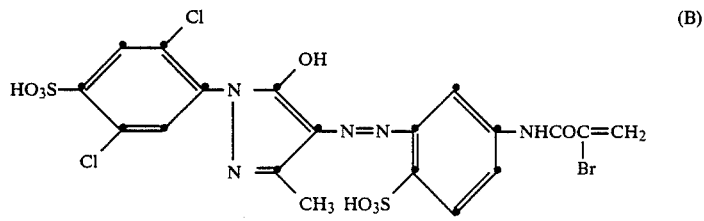

(B)

16.7% of a condensate of naphthalenesulfonic acid and formaldehyde (C)
8.0% of glycine as amphoteric surfactant (D)
6.0% of an anionic dispersant (E) obtained by reaction of o-phenylenediamine with stearic acid to 2-heptadecylbenzimidazole, subsequent alkylation with benzyl chloride and sulfonation with oleum monohydrate,
0.1% of a foam-inhibiting wetting agent (F), and
7.9% of residual moisture

| | |
|---|---|
| 16.7% | of a condensate of naphthalenesulfonic acid and formaldehyde (C) |
| 8.0% | of glycine as amphoteric surfactant (D) |
| 6.0% | of an anionic dispersant (E) obtained by reaction of o-phenylenediamine with stearic acid to 2-heptadecylbenzimidazole, subsequent alkylation with benzyl chloride and sulfonation with oleum monohydrate, |
| 0.1% | of a foam-inhibiting wetting agent (F), and |
| 7.9% | of residual moisture |
| 100.0% | | is prepared as follows:
With stirring, a mill is charged in succession with
400.0 parts of water
40.0 parts of the anionic dispersant (C)
28.4 parts of the amphoteric surfactant (D)
0.35 part of the foam-inhibiting wetting agent (F)
188.0 parts of the dye (A), and
29.4 parts of the dye (B)
to give initially a slurry, which goes into solution after c. 1 hour. With further stirring, 21.3 parts of the dispersant (E) and 19.2 parts of the dispersant (C) are added.

The resultant solution is then spray dried in a jet drier (air inlet temperature 185° C., air exit temperature 80°–85° C.) to give a solid formulation whose dissolving capacity and solubility in water is markedly enhanced.

EXAMPLE 2

A formulation comprising:
21.4% of the dye of formula (C)

(C)

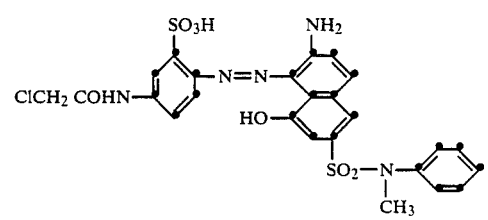

22.4% of the dye of formula (D)

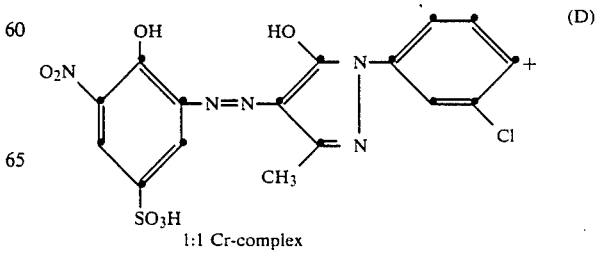

(D)

1:1 Cr-complex

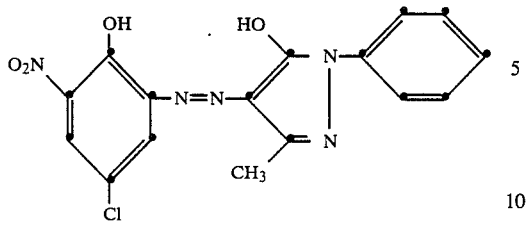

34.6% of a condensate of naphthalenesulfonic acid and formaldehyde (C)

8.0% of glycine as amphoteric surfactant (D)

6.0% of an anionic dispersant (E) obtained by reaction of o-phenylenediamine with stearic acid to 2-heptadecylbenzimidazole, subsequent alkylation with benzyl chloride and sulfonation with oleum monohydrate, 0.1% of a foam-inhibiting wetting agent (F), and 7.9% of residual moisture

| | |
|---|---|
| 34.6% | of a condensate of naphthalenesulfonic acid and formaldehyde (C) |
| 8.0% | of glycine as amphoteric surfactant (D) |
| 6.0% | of an anionic dispersant (E) obtained by reaction of o-phenylenediamine with stearic acid to 2-heptadecylbenzimidazole, subsequent alkylation with benzyl chloride and sulfonation with oleum monohydrate, |
| 0.1% | of a foam-inhibiting wetting agent (F), and |
| 7.9% | of residual moisture |
| 100.0% | | is prepared as follows:

With stirring, a mill is charged in succession with 444.3 parts of water 90.0 parts of the anionic dispersant (C)

32.0 parts of the amphoteric surfactant (D)

0.4 part of the foam-inhibiting wetting agent (F)

85.7 parts of the dye (C), and 88.1 parts of the dye (D)

to give a slurry, which is ground with glass beads for 4 hours in a microsol mill. After grinding, 48.2 parts of the dispersant (E), 24.0 parts of the dispersant (C) and 240.0 parts of water are added to the grinding stock.

The resultant suspension is then spray dried in a jet drier (air inlet temperature 185° C., air exit temperature 80°–85° C.) to give a solid formulation whose dissolving capacity and solubility in water is markedly enhanced.

What is claimed is:

1. A solid formulation comprising 20 to 80% by weight of at least two anionic wool dyes, 1 to 20% by weight of an anionic dispersant and 1 to 20% by weight of at least one amphoteric surfactant, the anionic wool dyes being selected from the group consisting of (a) triphenylmethane dyes having at least two sulfonic acid groups of the formula

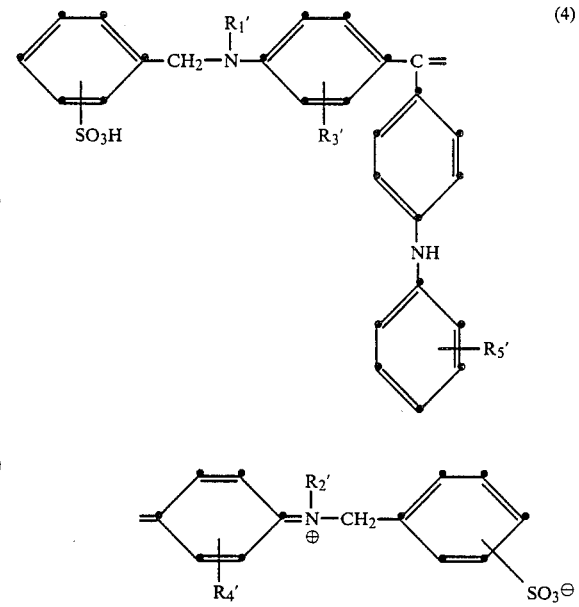

in which $R_1'$, $R_2'$, $R_3'$ and $R_4'$ independently of each other are $C_{1\text{-}4}$-alkyl and $R_5'$ is $C_{1\text{-}4}$-alkyl, $C_{1\text{-}4}$-alkoxy or hydrogen, (b) monoazo and disazo dyes of the formula

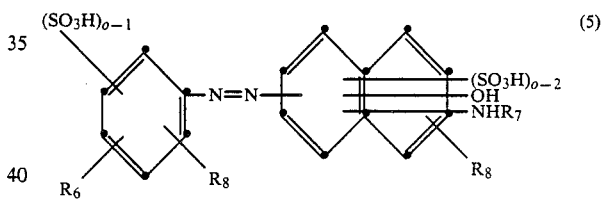

in which $R_6$ is a fibre-reactive group bonded via a —NH— group, benzoylamino, phenoxy, chlorophenoxy, dichlorophenoxy or methylphenoxy, $R_7$ is hydrogen, benzoyl, phenyl, $C_{1\text{-}4}$-alkyl, phenylsulfonyl, methylphenylsulfonyl or a fibre-reactive group which is or is not bonded via aminobenzoyl, and the substituents $R_8$ are independently of each other hydrogen or a phenylaminosulfonyl or N-phenyl-N-methylaminosulfonyl radical,

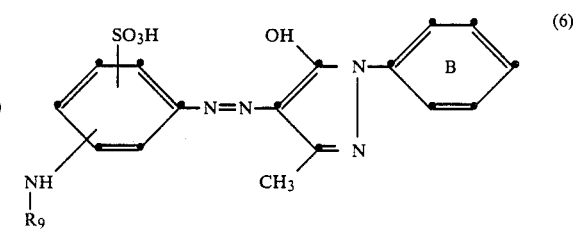

in which $R_9$ is a fibre-reactive group and the phenyl ring B can be substituted by halogen, $C_{1\text{-}4}$-alkyl and sulfo,

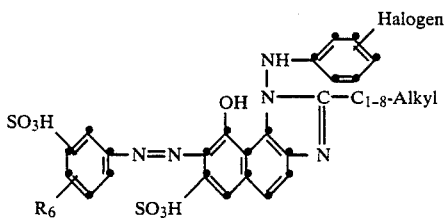
(7)

in which $R_6$ is as defined under formula (5), and

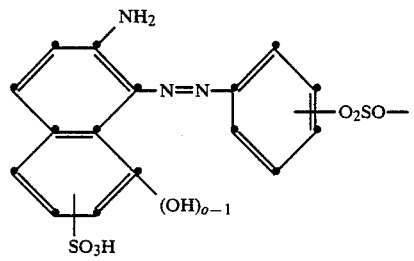
(8)

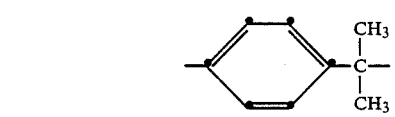

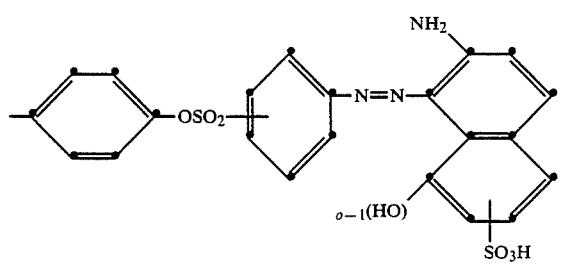

(c) the 1:2 chromium complex dyes of the azo and azomethine dyes of the formula (9)

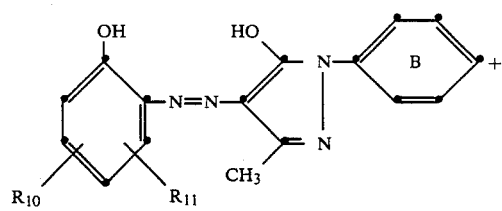
(9)

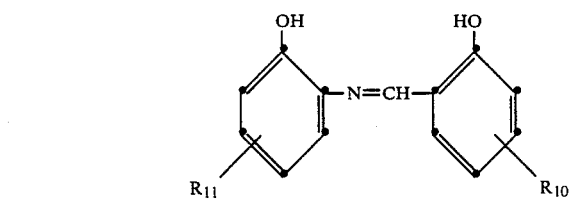

in which $R_{10}$ is hydrogen, sulfo or phenylazo, $R_{11}$ is hydrogen or nitro, and the phenyl ring B can contain the substituents specified under formula (6):

(d) the symmetrical 1:2 chromium complex dyes of azo dyes of the formulae (10) and (11)

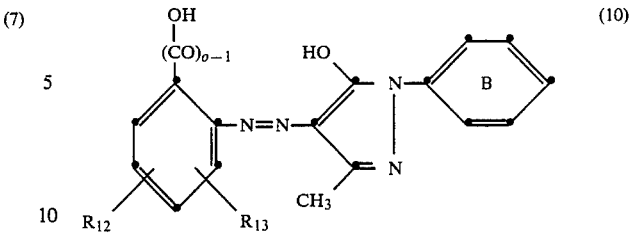
(10)

in which the phenyl ring B can contain the substituents specified under formula (6) and $R_{12}$ and $R_{13}$ independently of each other are hydrogen, nitro, sulfo, halogen, $C_{1-4}$-alkylsulfonyl, $C_{1-4}$-alkylaminosulfonyl or —$SO_2NH_2$;

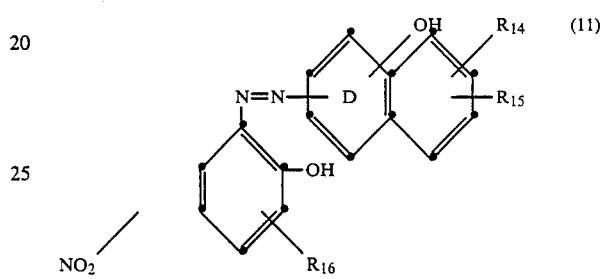
(11)

in which $R_{14}$ is hydrogen, $C_{1-4}$-alkoxycarbonylamino, benzoylamino, $C_{1-4}$-alkylsulfonylamino, phenylsulfonylamino, methylphenylsulfonylamino or halogen, $R_{15}$ is hydrogen or halogen, and $R_{16}$ is $C_{1-4}$-alkylsulfonyl, $C_{1-4}$-alkylaminosulfonyl, phenylazo, sulfo or —$SO_2NH_2$, and where the hydroxyl group in the benzo ring D is bonded in o-position relative to the azo bridge to the benzo ring D;

the symmetrical 1:2 cobalt complexes of azo dyes of the formulae

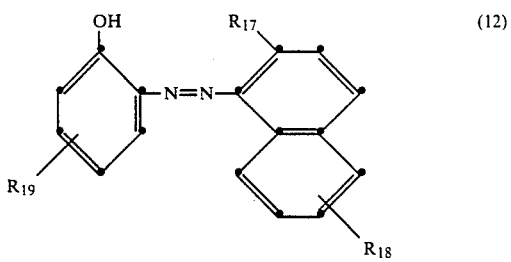
(12)

in which $R_{17}$ is the —OH or $NH_2$ group, $R_{18}$ is hydrogen or $C_{1-4}$-alkylaminosulfonyl, and $R_{19}$ is nitro or $C_{1-4}$-alkoxy-$C_{1-4}$-alkyleneaminosulfonyl; or

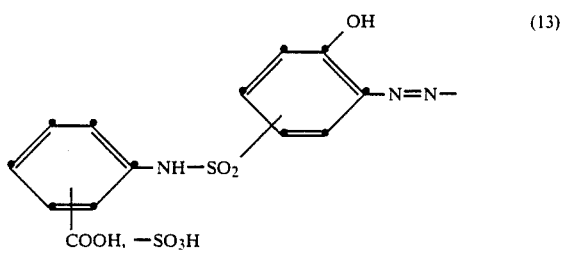
(13)

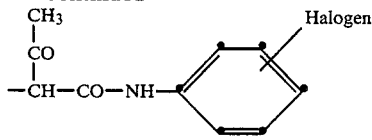

the 1:2 chromium complex dyes of azo dyes of the formulae

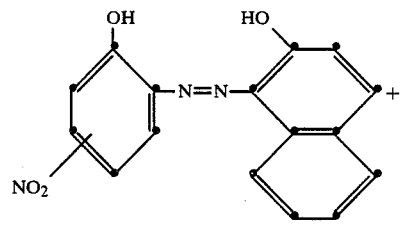

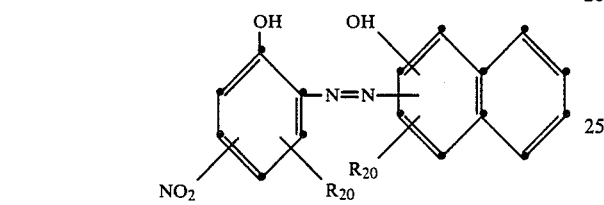

in which one of the substituents $R_{20}$ is hydrogen and the other is sulfo;

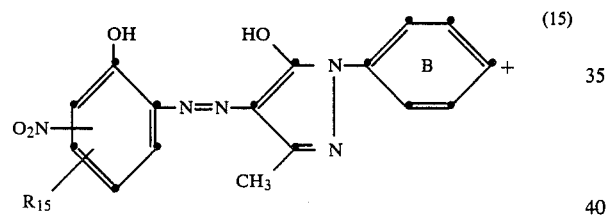

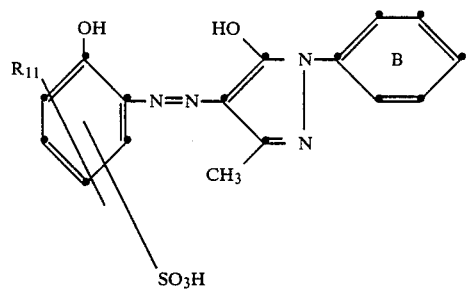

in which $R_{11}$ is as defined under formula (9) and $R_{15}$ is as defined under formula (11), and the phenyl rings B independently of each other can contain the substituents specified under formula (6); or of the formulae

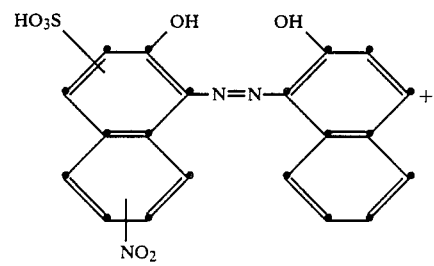

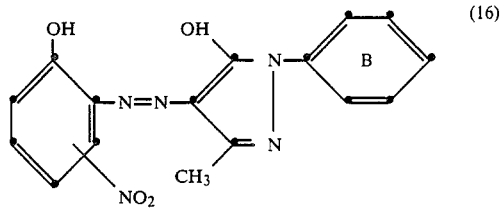

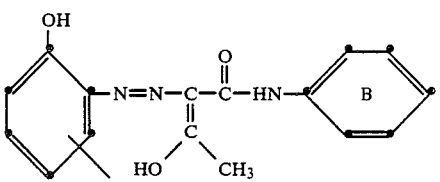

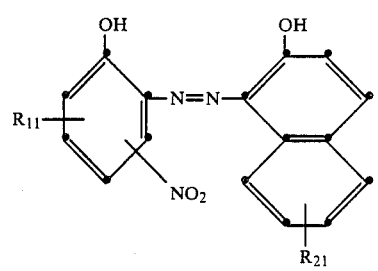

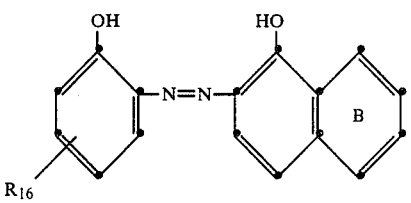

in which the phenyl ring B in the formulae (16), (17) and (19) can contain the substituents specified under formula (6), $R_{11}$ is as defined under formula (9), $R_{21}$ is hydrogen, methoxycarbonylamino or acetylamino, and $R_{16}$ is as defined under formula (11);

1:2 chromium complex dyes of azo dyes of the formulae (10)+(11); and

1:2 chromium mixed complexes of azo dyes of the formulae (10) and (11); and (e) anthraquinone dyes of the formulae

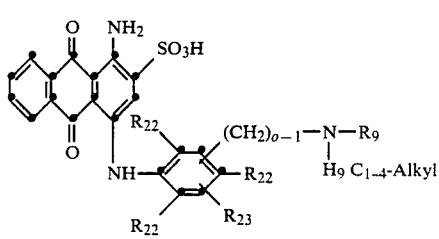

in which $R_9$ is as defined under formula (6), the $R_{22}$s independently of each other are hydrogen or $C_{1-4}$-alkyl, and $R_{23}$ is hydrogen or sulfo;

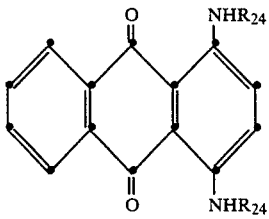

in which the substituents $R_{24}$ independently of each other are cyclohexyl or the diphenyl ether radical which can be substituted by sulfo or the radical $-CH_2NH-R_9$ in which $R_9$ is as defined under formula (6); and

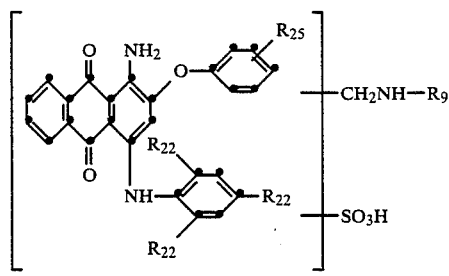

in which $R_9$ is as defined under formula (6), $R_{22}$ is as defined under formula (20), and $R_{25}$ is $C_{4-8}$-alkyl.

2. A solid formulation according to claim 1, wherein the amphoteric surfactant is a compound of the betaine type.

3. A solid formulation according to claim 2, wherein the amphoteric surfactant is a betaine of formula I

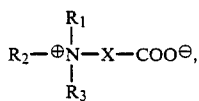

wherein $R_1$ and $R_3$ are each independently of the other a $C_1-C_4$alkyl radical, $R_2$ is a $C_1-C_{20}$alkyl radical, unsubstituted or substituted by hydroxy, acetylamino, lower alkoxy or halogen, X is a $C_1-C_3$alkylene radical, unsubstituted or substituted by a $C_5-C_{20}$alkyl radical.

4. A solid formulation according to claim 3, which contains a betaine of formula I, wherein $R_1$, $R_2$ and $R_3$ are methyl and X is methylene.

5. A solid formulation according to claim 1, wherein the amphoteric surfactant is glycine.

6. A solid formulation according to claim 1, wherein the amount of amphoteric surfactant is as great as or smaller than the amount of anionic dispersant.

7. A process for the preparation of a solid formulation as claimed in claim 1, which comprises mixing in the dry state at least two anionic wool dyes or a mixture of anionic, acid and metal complex dyes together with an anionic dispersant and at least one amphoteric surfactant and optional additional components.

8. A process for the preparation of a solid formulation as claimed in claim 1, which comprises suspending at least two anionic wool dyes or a mixture of anionic, acid and metal complex dyes together with an anionic dispersant and at least one amphoteric surfactant and optional additional components in water, and converting the resultant suspension into a solid formulation by drying.

9. A process according to claim 8, wherein the suspension is converted into a solid formulation by spray drying.

10. A process according to claim 8, wherein the suspension is subjected to a grinding procedure before being dried.

11. A process for the preparation of a dyebath, padding liquor or printing paste for dyeing or printing textile material, which comprises incorporating a solid formulation as claimed in claim 1 into the dyebath, padding liquor or printing paste.

12. A process for dyeing or printing wool or polyamide material, which comprises dyeing or printing the wool or polyamide material with a dyebath, padding liquor or printing paste containing a solid formulation as claimed in claim 1.

* * * * *